(12) United States Patent
Kurd et al.

(10) Patent No.: US 9,798,542 B2
(45) Date of Patent: Oct. 24, 2017

(54) ZERO OVERHEAD LOOPING BY A DECODER GENERATING AND ENQUEUING A BRANCH INSTRUCTION

(71) Applicant: Avago Technologies General IP (Singapore) Pte. Ltd., Singapore (SG)

(72) Inventors: Tariq Kurd, Bishopston (GB); John Redford, Cambridge (GB); Geoffrey Barrett, Bristol (GB)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 420 days.

(21) Appl. No.: 14/530,029

(22) Filed: Oct. 31, 2014

(65) Prior Publication Data

US 2015/0309795 A1    Oct. 29, 2015

Related U.S. Application Data

(60) Provisional application No. 61/984,710, filed on Apr. 25, 2014.

(51) Int. Cl.
*G06F 9/30* (2006.01)

(52) U.S. Cl.
CPC ...... *G06F 9/30065* (2013.01); *G06F 9/30145* (2013.01)

(58) Field of Classification Search
CPC .................................................. G06F 9/30065
See application file for complete search history.

(56) References Cited

U.S. PATENT DOCUMENTS

| 6,671,799 | B1 * | 12/2003 | Parthasarathy | ......... | G06F 9/381 |
| | | | | | 712/230 |
| 2009/0150658 | A1 * | 6/2009 | Mizumo | ................ | G06F 9/325 |
| | | | | | 712/241 |

* cited by examiner

*Primary Examiner* — Andrew Caldwell
*Assistant Examiner* — Jyoti Mehta
(74) *Attorney, Agent, or Firm* — Sterne, Kessler, Goldstein & Fox PLLC

(57) ABSTRACT

A method and apparatus for zero overheard loops is provided herein. The method includes the steps of identifying, by a decoder, a loop instruction and identifying, by the decoder, a last instruction in a loop body that corresponds to the loop instruction. The method further includes the steps of generating, by the decoder, a branch instruction that returns execution to a beginning of the loop body, and enqueing, by the decoder, the branch instruction into a branch reservation queue concurrently with an enqueing of the last instruction in a reservation queue.

17 Claims, 3 Drawing Sheets

| | IC1 | DE1 | DE2 | RS1 | RSN | EX1 |
|---|---|---|---|---|---|---|
| 0 | ZLOOP | | | | | |
| 1 | INST 1<br>Loop Count = -1 | ZLOOP<br>(Set loopstart, loopmatch, & loopcount registers) | | | | |
| 2 | INST 2<br>Loop Count = -1 | INST 1 | ZLOOP (SIN #0)<br>Generate SIN #1 | | | |
| 3 | Loopmatch Inst 3<br>Loop Count = -1 | INST 2 | INST 1<br>(SIN #1) | ZLOOP<br>(SIN #0) | | |
| 4 | INST 1<br>Loop Count = -2 | Loopmatch INST 3<br>(Generate synthethic branch instruction) | INST 2<br>(SIN #1) | INST 1<br>(SIN #1) | ZLOOP<br>(SIN #0) | |
| 5 | INST 2<br>Loop Count = (Loop Count + R$_0$) = (-2 + 10) = 8 | INST 1 | Loopmatch INST 3<br>(SIN #1)<br>(Generate SIN #2) | INST 2<br>(SIN #1) | INST 1<br>(SIN #1) | ZLOOP<br>(SIN #0) |
| 6 | Loopmatch Inst 3<br>Loop Count = 8 | INST 2 | INST 1<br>(SIN #2) | Loopmatch INST 3<br>(SIN #1) | INST 2<br>(SIN #1) | INST 1<br>(SIN #1) |
| 7 | INST 1<br>Loop Count = 7 | Loopmatch INST 3 | INST 2<br>(SIN #2) | INST 1<br>(SIN #2) | Loopmatch INST 3<br>(SIN #1) | INST 2<br>(SIN #1) |
| 8 | INST 2<br>Loop count = 7 | INST 1 | Loopmatch INST 3<br>(no more SIN generation) | INST 2<br>(SIN #2) | INST 1<br>(SIN #2) | Loopmatch INST3<br>(SIN #1) |

FIG. 3

ZERO OVERHEAD LOOPING BY A DECODER GENERATING AND ENQUEUING A BRANCH INSTRUCTION

BACKGROUND OF THE INVENTION

Field of the Invention

This disclosure generally relates to loops and more specifically to execution of zero overheard loops in a computer processor.

Background Art

Executing loops results in overhead required to maintain the loop. Such overhead includes, for example, an instruction to decrement or increment a loop count, and an instruction to transfer program execution to a start of a loop body, and an instruction to exit the loop body. In conventional processors, these overhead instructions require additional clock cycles for execution.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

FIG. 3 illustrates an example processing of a zero overheard loop according to an embodiment of the disclosure.

Figure 1:
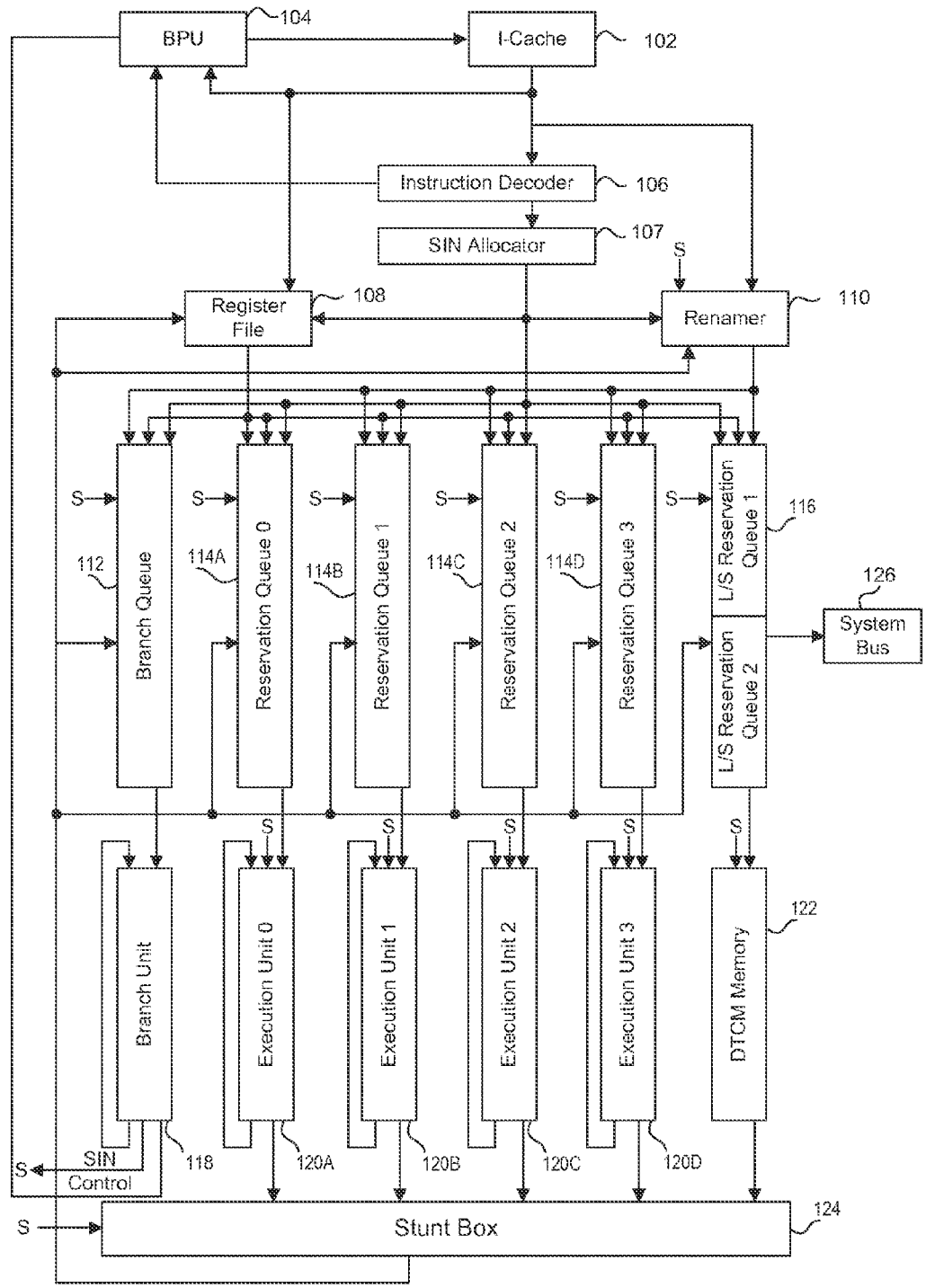
FIG. 1 is a high-level block diagram of an exemplary processor.

The figures illustrate various components, their arrangements, and interconnections. Unless expressly stated to the contrary, the figures are not necessarily drawn to scale.

DETAILED DESCRIPTION

The following Detailed Description refers to accompanying drawings to illustrate exemplary embodiments consistent with the disclosure herein. References in the Detailed Description to "one exemplary embodiment," "an illustrative embodiment", "an example embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure herein. Therefore, the Detailed Description is not meant to limit the disclosure. Rather, the scope of the disclosure is defined only in accordance with the following claims and their equivalents.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Terminology

The terms, chip, die, integrated circuit, semiconductor device, and microelectronic device, are often used interchangeably in the field of electronics.

FET, as used herein, refers to metal-oxide-semiconductor field effect transistors (MOSFETs). An n-channel FET is referred to herein as an NFET. A p-channel FET is referred to herein as a PFET.

CMOS is an acronym that stands for Complementary Metal Oxide Semiconductor, and refers to a semiconductor manufacturing process in which both NFETs are PFETs are formed in the same chip.

CMOS circuit refers to a circuit in which both NFETs and PFETs are used together.

SoC is an acronym that stands for System on a Chip, and refers to a chip that includes two or more circuit blocks, typically interconnected by a bus, where those circuit blocks provide such high levels of functionality that these blocks would have been considered system-level components in the past. By way of example, circuit blocks having the requisite level of functionality as of this date include scalar, superscalar, and very long instruction word processors; DRAM controllers (e.g., DDR3, DDR4 and DDR5); flash memory controllers; Universal Serial Bus (USB) controllers; and the like. This list is intended to be illustrative and not limiting. Another common way of describing an SoC is a chip that includes all the components that would be needed to implement an electronic system such as, for example, a computer system or a computer-based system.

VLIW is an acronym for Very Long Instruction Word.

VLIW instruction, as used in the description of exemplary embodiments herein, refers to a set of instructions grouped together for presentation to the instruction decoder. The individual instructions in the set of instructions are assigned to one of a plurality of execution pipes for execution.

IC0 refers to a pseudo-stage which is on the input to the instruction cache.

IC1 refers to the instruction cache stage. Fetch requests to the instruction cache are made in this cycle, along with calculations to determine which PC to fetch next. VLIW instructions previously requested are supplied in this stage.

DE1 refers to the first stage of the instruction decoder.

DE1_operation refers to a logical operation performed by the first stage of the instruction decoder.

DE1_time refers to a cycle in which a DE_1 operation occurs.

DE2 refers to the second stage of the instruction decoder.

DE2_operation refers to a logical operation performed by the second stage of the instruction decoder.

DE2_time refers to the cycle in which the reading and renaming of the general register file (GRF) and predicate register file (PREG) occurs.

RS refers to a reservation station. There are several different reservation stations that can be enqueued to. In the best case this is a single cycle stage, however operations may end up queuing here for many cycles.

EXn refers to an nth stage of an execution pipe. Examples of execution pipes include ALU short and long pipes, BRANCH and the Load Store Unit.

SHP refers to a short execution pipe. A short execution pipe is used to perform single cycle operations.

LOP refers to a long execution pipe. A long execution pipe is used to execute instructions that take 2-8 cycles to complete.

LSU refers to the load store unit.

DTCM refers to a data tightly coupled memory.

PBUS refers to a bus that connects to a peripheral memory.

DCACHE refers to the data cache used to cache accesses to peripheral memory.

Enqueue refers to the action in which a VLIW instruction in DE2 is split into its component operations and then move forward down the pipe into the reservation stations.

Issue refers to moving an operation from the reservation station to an execution unit. An operation is referred to as being issued when it is moved from the reservation station to an execution unit. An operation is a component part of a VLIW instruction.

Current PC refers to the value of the program counter (PC) for the instruction currently in a given stage. Each stage of the pipe will have its own version of the current PC.

Next PC refers to the next PC to fetch from the Icache. For straight line code this will be current PC+ current instruction width, for redirected code it will be the new target PC.

Loop start address refers to the address of the first instruction in a loop body, i.e., the address to branch to for starting a new loop iteration.

Loop end address refers to the address of the first instruction after a loop body, i.e., the address to branch to for naturally exiting the loop.

Loop body refers to the instructions beginning with the loop start dress and ending with the loop match address.

Loop match address refers to the address of the last instruction in a loop body.

Loop count refers to the number of iterations of the loop that should be executed. This comes from either an immediate field for LOOP operations, or a general register for ZLOOP and ZLOOPS operations.

SIN refers to the Speculation Index Number, which is used to identify instructions enqueued speculatively in the shadow of a branch.

SIN resolution refers to determining whether a branch was correctly speculated or not. SIN resolution is performed in EX1.

SIN validation refers to a branch in EX1 that was correctly speculated, which in turn will validate the SIN associated with the operations in the shadow of the correctly speculated branch. A validated operation is one which will update the architectural state.

SIN cancellation refers to a branch in EX1 that was incorrectly speculated, which in turn will cancel all outstanding SINs, and perform an EX1 redirect, effectively removing all operations that were in the shadow of the branch it from the execution pipe. In one embodiment, removing the operation that were in the shadow of the incorrectly speculated branch includes changing the state of a bit associated with each of those instruction in the execution pipe.

State coherency enforcement (SCE) refers to actions performed by an internal mechanism to prevent future operations from seeing an incoherent machine state.

Trap events refers to the set of synchronous, asynchronous and fault events.

Synchronous trap events relate to a specific instruction and are detected in time to prevent the instruction causing the event from being enqueued. The Supervisor Call (SVC) instruction fits into this category. These are precise as they occur in an architecturally defined place in the instruction stream.

Asynchronous trap events (interrupts) occur independently from the current instruction sequence. Asynchronous exceptions fit into this.

Fault trap events prevent program flow from recovering. Examples of fault trap events are a misaligned PC and a data abort. Faulting operations with a register destination must complete a register value.

A processor architecture is disclosed that includes a register file having a plurality of registers, and is configured for out-of-order instruction execution, further includes a renamer unit that produces generation numbers that are associated with register file addresses to provide a renamed version of a register that is temporally offset from an existing version of that register rather than assigning a non-programmer-visible physical register as the renamed register. The processor architecture may include a reset dual history length (DHL) Gshare branch prediction unit coupled to an instruction cache and configured to provide speculative addresses to the instruction cache. The processor architecture is suitable for implementation in an integrated circuit. Such an integrated circuit is typically implemented with CMOS circuitry.

In typical embodiments a processor in accordance with this disclosure is implemented in an integrated circuits as an embedded processor.

FIG. 1 is a high-level block diagram illustrating the major blocks of an exemplary processor in accordance with the disclosure. The exemplary processor includes an instruction cache 102 coupled to receive a VLIW instruction address from a branch prediction unit 104, and further coupled to provide an output to branch prediction unit 104, an instruction decoder 106, a register file 108, and a generation renamer 110. Generation renamer 110 is coupled to branch execution unit 118 to receive a SIN control signal, coupled to the SIN Allocator to receive a SIN number, coupled to a stunt box 124 to receive an output from an operand copy network, and coupled to the branch reservation queue 112, execution pipe reservation queues 114A, 114B, 114C, 114D, and load/store reservation queue 116. Register file 108 is coupled to stunt box 124 to receive input from the operand copy network, and is further coupled to the branch reservation queue 112, execution pipe reservation queues 114A, 114B, 114C, 114D, and load/store reservation queue 116. Branch reservation queue 112 is coupled to branch execution unit 118. Execution pipe reservation queues 114A, 114B, 114C, 114D are each respectively coupled to corresponding execution pipes 120A, 120B, 120C, and 120D. Execution pipes 120A, 120B, 120C, and 120D are each coupled to provide output to stunt box 124. Each of execution pipes 120A, 120B, 120C, and 120D are respectively coupled to provide their output back to their inputs, and each is further coupled to the output of branch execution unit 118 to receive the SIN control signal. A memory 122 is coupled to the load/store unit 116. And load/store unit 116 is further coupled to a system bus 126.

Instruction cache 102 holds VLIW instructions that have been previously fetched by an instruction fetch unit (not shown). The VLIW instructions are typically fetched from a memory disposed external to the processor itself. Branch prediction unit 104 is shown coupled to instruction cache 102. Branch prediction unit 104 provides the address of the VLIW instruction to fetch. If the requested VLIW instruction is present in instruction cache 102 then it is provided to an instruction decoder 106. If the requested VLIW instruction is not present in instruction cache 102 then a cache miss has occurred and the requested instruction is fetched from a memory that is disposed outside of the processor.

Branch prediction unit 104 has several functions, including providing the program counter value needed by instruction cache 102, and the program counter value needed by different stages and logic blocks throughout the processor. For sequentially executing program code, the program counter value simply changes by the length of the instruction just fetched. But when a branch instruction is detected, then branch prediction unit 104 determines what from what address the next instruction should be fetched. In this exemplary processor, branch prediction unit 104 uses a small reset DHL Gshare branch prediction mechanism to determine the next instruction address.

Instruction decoder 106 decodes the content of the VLIW instructions and provides control information to various other blocks of the processor.

Register file 108 contains a predetermined number of programmer-visible registers. These registers hold values that are used during the execution of a program.

Individual instructions obtained from the VLIW instruction are enqueued into a selected reservation queue. When the operands needed for execution of an enqueued instruction become available, that instruction is issued to the execution pipe associated with the selected reservation queue.

Generation renamer 110 is used to assign generation numbers to register instances in instructions when those register instances would conventionally be reassigned to a different non-programmer-visible physical register.

The reservation queues hold instructions that are waiting to be issued.

Stunt box 124 provides a mechanism for receiving and distributing the outputs of the execution pipes. Stunt box 124 provides data to an operand copy network. The operand copy network allows all the results of the execution pipes to be made available to other blocks within the processor. In this way, an instruction waiting for an operand to be produced from the execution of another instruction does not have to wait for that operand to be written back to the register file and then read out of the register file. Rather the required operand is made available, via the operand copy network, to all the locations throughout the processor that are waiting for that particular result.

System bus 126 provides a mechanism for the embedded processor to communicate with other logic blocks on the integrated circuit that are external to the processor itself.

Loops

A "loop" is typically a sequence of one or more instructions that is repeated a specific number of times in response to a "loop instruction" or a "loop operation." The sequence of instructions that is repeated is typically referred to as a "loop body." Loop start address refers to the address of the first instruction in a loop body, i.e., the address to branch to for starting a new loop iteration. Loop end address refers to the address of the first instruction after a loop body, i.e., the address to branch to for naturally exiting the loop. Loop body can also be referred to as the instructions beginning with the loop start address and ending with the loop match address. Example pseudo code for a loop is shown below:

```
For (i=0; i<n, i++)
{
  INST 1;
  INST 2:
  INST 3;
}
```

In the example above, "For (i=0; i<n, i++)" can be referred to as the loop instruction. The loop body includes the instructions INST 1, INST 2 and INST 3. It is to be appreciated that even though only three instructions are shown in the example above, the number of instructions in a loop body is arbitrary. In the above example, "n" is the "loop count" which dictates the number of times instructions in the loop body are executed. In an example, n may be an immediate value e.g., a n=5, which is encoded in the loop instruction itself and that indicates that the loop body must be executed 5 times. In another example, the value of n is obtained from the general register file of the processor or from another place in an instruction pipeline. If the loop instruction and the loop body is fetched, decoded, and executed without knowing the value of "n," then the loop count n is known as a "speculative count." The loop count "n" is said to be "resolved" when its value is determined either by accessing it from the general register file or from another location in the processor. An iteration of the loop body may be speculatively executed. When it is determined that the iteration of the loop body was supposed to be executed or not executed, then that iteration of the loop body is said to have been "resolved."

In conventional architectures, a compiler may synthesize and execute the following assembly language equivalent for the loop example shown above:

```
      MOV R0, n
Loop_start:
      BREQZ R0, Loop end
      SUB R0, R0, 1;
      INST 1;
      INST 2;
      INST 3;
      BR Loop_start
Loop_end:
      INST 4;
      ....
      INST N;
```

In the example above, in order to execute the loop, the compiler first generates the move (MOV) instruction that moves the loop count n, if available, into a register, for example register R0. The compiler also generates additional instructions such as the branch equal to zero (BREQZ), the subtract (SUB), and branch (BR) instructions. The BREQZ, SUB, and BR instructions increase the size of the original loop body by three instructions.

The BREQZ R0, Loop end is inserted by the compiler at the loop start address. "Loop start" is a "label" in the example above. A label is a name or number assigned to a fixed position within code, and which may be referenced by other instructions appearing elsewhere in the code. A label has no effect other than marking a position of an instruction within code. "Loop start" or "loop start address" as used herein refers to the address of the first instruction in the loop body. In this example, the loop start address references the BREQZ instruction that is generated by the compiler. "Loop end" or "loop end address" as used herein refers the address of the first instruction after the loop body. In the example above, loop end refers to INST 4 that is the first instruction after the loop body. When the value in R0 is not equal to 0, the BREQZ instruction will exit the loop and transfer program execution to INST 4 at the loop end address. Alternatively, if the that iteration of the loop body was speculatively executed and it is determined later in the pipeline that it should not have been executed, then program execution is again transferred to INST 4. In another example, if the original value in R0 was 0 (i.e., it was an empty loop), then program execution is again transferred to INST 4.

In addition to the MOV and BREQZ instructions, the compiler generates a subtract (SUB) instruction sub R0, R0, #1 that decrements a value in R0 by the immediate value of "1" each time the loop body is executed. Furthermore, after INST 3, the compiler also generates a branch instruction BR Loop start. BR Loop start transitions program execution back to the Loop start address. In this example of conventional assembly language code, the BREQZ instruction, the SUB instruction, and the BR instruction represent the extra instructions or "overhead" required for executing a loop. These overhead instructions are used to maintain the number of times the loop is executed, transitions to the start of the loop, as well as when the loop is to be exited.

The BREQZ, SUB, and BR instructions are overhead instructions that need to be executed every time the loop body is executed. In conventional processors, these overhead instructions add three additional cycles every time the loop body is executed. For a short loop, such as the one shown above that has only three instructions INST 1, INST 2, and INST 3, such overheard instructions almost double the number of cycles required for execution of the loop body. Accordingly, embodiments presented herein provide a zero overheard loop instruction referred to as a "ZLOOP" that significantly reduces the overheard required to executed a loop. According to an embodiment of the disclosure, example high level program code as it might be written by a programmer using the ZLOOP instruction is shown below:

```
ZLOOP n, Loop_start
    INST 1;
    INST 2;
    INST 3;
Loop_end:
    INST 4;
    ....
    INST N;
```

According to an embodiment of the disclosure, the above high-level program code will be synthesized and executed by the processor as shown in the following assembly language equivalent:

```
MOV R0, n;
BREQZ R0, Loop_end : SUB loopcount, R0, #1
Loop_start:
    INST 1;
    INST 2;
Loop_match:
    INST 3: BRNEZ loopcount, Loop start: SUB loopcount, loopcount, #1;
Loop_end:
    INST 4;
....
    INST N;
```

The ":" in the example synthesized code denotes either a program label (such as "Loop_end" or it means that the instructions separated by the ":" will be fetched in the same cycle. The code above only has the one-time execution overhead of MOV and the BREQZ instruction that is before the loop start address when compared to the conventional assembly language above. The BREQZ instruction is to check whether the loop is empty, i.e. R0 is equal to 0, and should not be executed. The "loopcount" in the instructions above refers to a loopcount register 200 in FIG. 2, described further below, that stores either a loop count value (in the case of loop instructions that have an immediate value or a resolved value of the loop count) or a speculative loop count value (in the case when the loop count is unresolved).

According to an embodiment of the disclosure, a "loop match" label or loop match address to indicate the last instruction in the loop is generated by the compiler. The loop match address refers to the address of the last instruction in the loop body i.e. INST 3. In the DE1 stage of the pipeline, upon detecting the loop match address that signifies the last instruction in the loop body, the instruction decoder 106, as opposed to a program compiler, generates and enqueues the BRNEZ loopcount, Loop start instruction in a branch reservation queue 112 concurrently with enqueing INST 3 and SUB R0, R0, #1 in one or more of reservation queues 114A-D. In an alternative, INST 3 could be enqueued in load/store reservation queue 116. It is to be noted that since this branch instruction is generated by the instruction decoder 106 as opposed to a compiler or a programmer it is referred to herein as a "synthetic" branch. Since the synthetic BRNEZ instruction is enqueued concurrently with INST 3 along with the SUB instruction, there is no need for extra clock cycles to enqueue the generated BRNEZ instruction and SUB instruction thereby resulting in a zero overheard processing of the loop instruction. In an example, the last instruction in the loop body i.e., INST 3 in the example above, cannot be another branch instruction. While the generation of the synthetic branch instruction takes place in the DE1 stage in the examples provided herein, it is to be appreciated that the generation of the synthetic branch instruction could take place in other stages of the pipeline and by other units besides an instruction decoder.

According to a further embodiment of the disclosure, if the loop count is unresolved, the loop body will continue to be fetched and executed speculatively until it is resolved. If the number of times the loop body is to be executed (i.e., the loop count) is less than the number of fetched iterations of the loop body, then instructions associated with excessively fetched iterations of the loop body are cancelled. Cancellation of instructions entails flushing them from the pipeline and not committing any results produced by them to the architectural state of the processor. Essentially, cancellation of an instruction means that it is removed from the pipeline as if it was never fetched or executed. If the loop count is encoded in the instruction as an immediate value, then the loop count is known and does not need to be resolved. In that example, there will be no excessively fetched iterations of the loop body. Such a loop instruction that includes an immediate loop count value is referred to as a "LOOP" instruction herein. If the loop count is a signed value that is not immediate, then the instruction is referred to as a "ZLOOPS" instruction. Further details for implementing embodiments presented herein are provided below with reference to examples in FIGS. 2 and 3.

Figure 2:
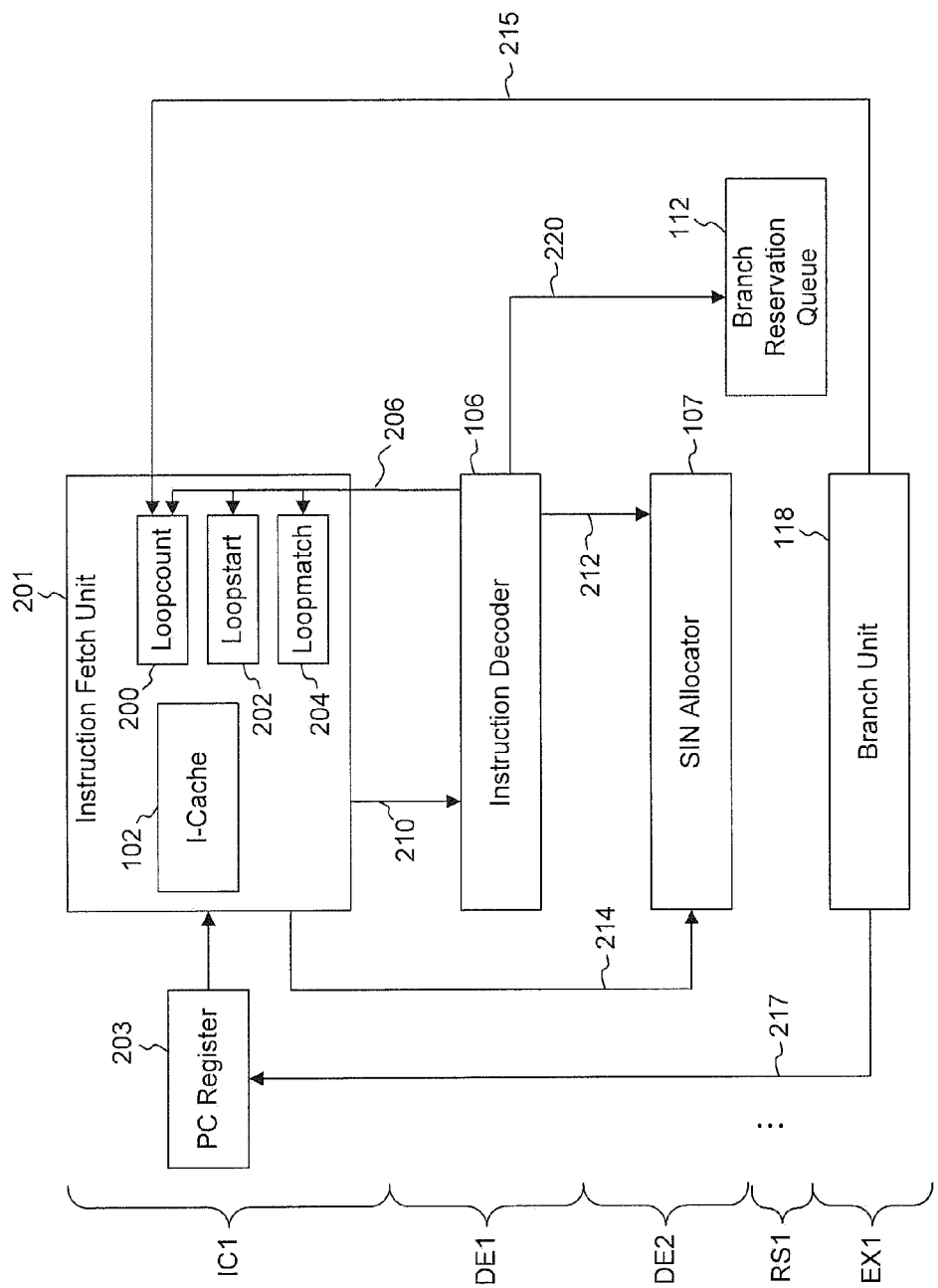
FIG. 2 illustrates a portion of an architecture for implementing a zero overhead loop according to an embodiment of the disclosure.

FIG. 2 illustrates a portion of an architecture for implementing a zero overhead loop according to an embodiment of the disclosure.

FIG. 2 illustrates an instruction fetch unit 201, instruction decoder 106 SIN allocator 107, program counter register 203, branch reservation queue 112, and branch unit 118.

Instruction fetch unit 201 is coupled to instruction decoder 107, SIN allocator 107, program counter register 203, and branch unit 118. In an example, program counter register 203 stores the "program counter" alternatively referred to as a "program counter value." In an alternative embodiment, the program counter value may be received from other places in the pipeline besides the program counter register 203. Branch reservation queue 112 is coupled to instruction decoder 106.

Instruction fetch unit 201 includes an instruction cache (Icache) 102, a loopcount register 200, a loopstart register 202, and a loopmatch register 204. The loopcount register 200 stores either an loop count value (in the case of loop instructions that have an immediate value or a resolved value of the loop count) or a speculative loop count value (in the case when the loop count is unresolved). The speculative loop count value is replaced with the loop count when the loop count is resolved (for example, when the branch is executed in the branch unit 118 in the EX1 stage). The loopstart register 202 stores the loop start address and the loopmatch register 204 stores the loop match address.

FIG. 2 will now be described in conjunction with FIG. 3. The columns in FIG. 3 are the pipeline stages. IC1 is an instruction fetch stage. DE1 and DE2 are decode stages. RS1 and RS2 are reservation queue stages. EX1 is an execution stage. It is to be appreciated that there may be one or more than one IC, DE, RS, and EX stages. The rows in FIG. 1 illustrate clock cycles. The nomenclature X:Y stands for pipeline stage: clock cycle.

In IC1:0 the ZLOOP instruction is fetched, for example, by instruction fetch unit 201 from Icache 102. In DE1:1, the ZLOOP instruction is received by the instruction decoder 106. Upon receiving the ZLOOP instruction, the instruction decoder 106 stores the loop start address in loop start register 202, stores the loop match address in the loop match register 204, and sets the value in loop count register 200 to −1. The count is currently negative to indicate that the loop body is to be executed speculatively while the actual loop count is unknown. This is because the loop count may be stored in register R0 or in another place in the processor and may not be available or accessible yet. The loop count may not be resolved until the loop is resolved in branch unit 118. In an example, instruction decoder 106 sets the values in loop count register 200, loopstart register 202 and loopmatch register 204 using the Zloop_detect signal 206 in FIG. 2. In DE1:1, the instruction decoder 106 also sends a SIN_generate_signal 212 to SIN allocator 107 to generate SIN numbers for the ZLOOP instruction and instructions in the loop body. While the loop count is speculative, instruction fetch unit also asserts the loop_count_speculative signal 214 that indicates SIN allocator 107 should continue generating SIN numbers while the loop count is speculative.

In DE2:2, the ZLOOP instruction is assigned SIN #0 since the ZLOOP instruction itself was fetched speculatively by instruction fetch unit 201. SIN #1 is generated by SIN allocator 107 to assign to instructions in the loop body (i.e. INST 1, INST 2, and INST 3) for the first iteration of the loop body. For example, when INST 1 reaches DE2:3, SIN #1 is assigned to INST 1, when INST 2 reaches DE2:4, SIN #1 is assigned to INST 2, and when INST 3 reaches DE2:4, SIN#1 is assigned to INST 3.

When the loop match label and INST 3 reach DE1:4, instruction fetch unit 201 detects the loop match label by comparing it to the value stored in loopmatch register 204 and sends a loopmatch signal 210 to instruction decoder 106 to generate the synthetic BRNEZ instruction. As described above, the loop match label refers to the last instruction in the loop body i.e., INST 3. In response to receiving the loopmatch signal 210, instruction decoder 106 generates the synthetic branch instruction BRNEZ for enqueing into branch reservation queue 112 in the same cycle in which INST 3 is enqueued into one of reservation queues 114A-D. In an alternative, INST 3 could be enqueued in load/store reservation queue 116. In an example, instruction decoder 106 enqueues the synthetic branch instruction in branch reservation queue 112 using signal 220. For example, if INST 3 is an arithmetic instruction it will be enqueued into one of the reservation queues 114A-D and if it is a load/store instruction it will be enqueued into one of load/store reservation queues 116, while the synthetic BRNEZ instruction will be concurrently enqueued in the branch reservation queue 112. It is to be appreciated that while in the example presented herein, the synthetic branch BRNEZ is a branch not equal to zero, in other examples, a branch equal to zero (BREQZ), a branch less than zero (BRLEZ), or branch greater than zero (BRGTZ) instruction may be generated instead.

In DE1:4, upon detecting the loop match label that refers to the last instruction in the loop body (i.e., INST 3 in this example), instruction decoder 106 again sets the Zloop detect signal 206 to set the count value in loopcount register 200 to −2 to indicate that a second speculative fetch and execute of the loop body is to take place.

When INST 3 along with the loop match label reaches DE2:5, in response to the loop match label, instruction decoder 106 again sends the SIN_generate_signal 212 to SIN allocator 107 to generate SIN #2 to be assigned to instructions for the second speculative execution of the loop body.

When the ZLOOP instruction reaches EX1:5 it is executed by branch unit 118 and the loop is resolved. If the loop is empty, i.e. the actual loop count (as indicated by the actual value of R0) is determined to be 0, then the loop is exited and the program counter is redirected by branch unit 118 using redirect signal 217 to the instruction indicated by the loop end label i.e., INST 4, and all the speculatively fetched instructions from the loop body are canceled. If the loop is not empty, i.e. R0 is greater than 0, then the value of R0 is sent via loop_count_actual signal 215 to instruction fetch unit 201 where it is added to the value stored in loopcount register 200 to determine the loop count. In this example, R0 is 10, which is added to −2 and the resulting value is loop count of 8. This indicates that the loop has been executed twice and there are still 8 more iterations of the loop body to be executed.

Once the count has been resolved by determining the value for R0 in EX1:5 the loopmatch_speculative signal 214 is de-asserted. In response to the loopmatch_speculative signal 214 being de-asserted, SIN allocator 107 stops allocating further SIN numbers. Thus, in this example only two SIN numbers are generated. If the loop count (indicated by R0), was 0 indicating an empty loop, then all the instructions with SIN numbers #1 and #2 will be canceled although the ZLOOP instruction itself with SIN number#0 will be validated. If in another example, R0 was determined to be 1, then the first speculative iteration of the loop is valid and the second iteration of the loop with SIN #2 is invalidated and flushed from the pipeline.

In EX1:5, INST 3 along with the BRNEZ loopcount, Loop start instruction is executed in branch unit 118 to determine whether the branch should have been executed. For example, if loop count indicated by R0 is 0 or less than 0 or if the ZLOOP itself was wrongly speculated to be executed, then branch unit 118 may send redirect signal 217 to redirect program counter register 203 to the instruction indicated by the loop end address i.e., INST 4 and cancel all instructions associated with SIN #1 and #2 along with the ZLOOP instruction associated with SIN #0. If it is determined that the branch was to be executed and the loop count as indicated by R0 is not 0, then the corresponding SIN numbers are "released." Releasing SIN numbers as referred to herein means that the instructions in the loop body with released SIN numbers will be executed and their values will not be flushed from the pipeline. In this example, if R0 is 2 or more than 2, then both SIN #1 and #2 will be released. If R0 was 1, then SIN #1 will be released and SIN #2 will be invalidated thereby flushing the instructions associated with SIN #2.

CONCLUSION

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method in a processor, comprising:
identifying, by a decoder, a loop instruction;
identifying, by the decoder, a last instruction in a loop body that corresponds to the loop instruction;
generating, by the decoder, a branch instruction that returns execution to a beginning of the loop body; and
enqueuing, by the decoder, the branch instruction into a branch reservation queue concurrently with an enqueuing of the last instruction in a reservation queue.

2. The method of claim 1, further comprising maintaining a count of a number of times iterations of the loop body are fetched.

3. The method of claim 2, wherein the count is maintained in a register in an instruction fetch unit.

4. The method of claim 1, wherein the last instruction is not a branch instruction.

5. The method of claim 1, further comprising executing the loop body speculatively until a loop count is resolved, wherein the loop count is a number of times the loop body is to be executed.

6. The method of claim 5, wherein resolving the loop count includes determining the number of times the loop body is to be executed.

7. The method of claim 6, further comprising canceling instructions associated with excessively fetched iterations of the loop body responsive to the number of times the loop body is to be executed being less than a number of fetched iterations of the loop body.

8. The method of claim 1, wherein the loop instruction does not include an encoded immediate value of a number of times the loop instruction is to be executed.

9. The method of claim 1, further comprising fetching a number of iterations of the loop body equal to an immediate value encoded in the loop instruction.

10. The method of claim 1, wherein the identifying the loop instruction further comprises using an opcode to identify the loop instruction.

11. An apparatus, comprising:
a decoder configured to identify a loop instruction, identify a last instruction in a loop body corresponding to the loop instruction, generate a branch instruction that returns execution to a beginning of the loop body, and enqueue the branch instruction into a branch reservation queue concurrently with an enqueuing of the last instruction in the loop body in a reservation queue.

12. The apparatus of claim 11, further comprising:
an instruction fetch unit including a first register configured to store a count of a number of times iterations of the loop body are fetched, a second register configured to store a start address of the loop body, and a third register configured to store an address that identifies the last instruction in the loop body in response to a signal received from the decoder that indicates the loop instruction has been decoded.

13. The apparatus of claim 12, wherein the instruction fetch unit is configured to assert a signal that directs the decoder to generate the branch instruction in response to fetching the last instruction based on the address that identifies the last instruction in the loop body.

14. The apparatus of claim 11, wherein the last instruction is not a branch instruction.

15. The apparatus of claim 11, wherein the decoder is configured to identify the loop instruction based on an opcode of the loop instruction.

16. The apparatus of claim 11, wherein the loop instruction does not include an encoded immediate value of a number of times the loop instruction is to be executed.

17. The apparatus of claim 11, wherein the decoder is configured to cancel instructions associated with excessively fetched iterations of the loop body responsive to a number of times the loop body is to be executed being less than a number of fetched iterations of the loop body.

* * * * *